Dec. 8, 1936.  G. L. N. MEYER  2,063,326
FILLER VALVE
Filed June 5, 1933  3 Sheets-Sheet 1

INVENTOR
George L. N. Meyer
BY
Erwin B. [illegible]
ATTORNEY

Dec. 8, 1936. G. L. N. MEYER 2,063,326
FILLER VALVE
Filed June 5, 1933 3 Sheets-Sheet 2

INVENTOR
George L. N. Meyer
BY
Erwin B. Ewing
ATTORNEY

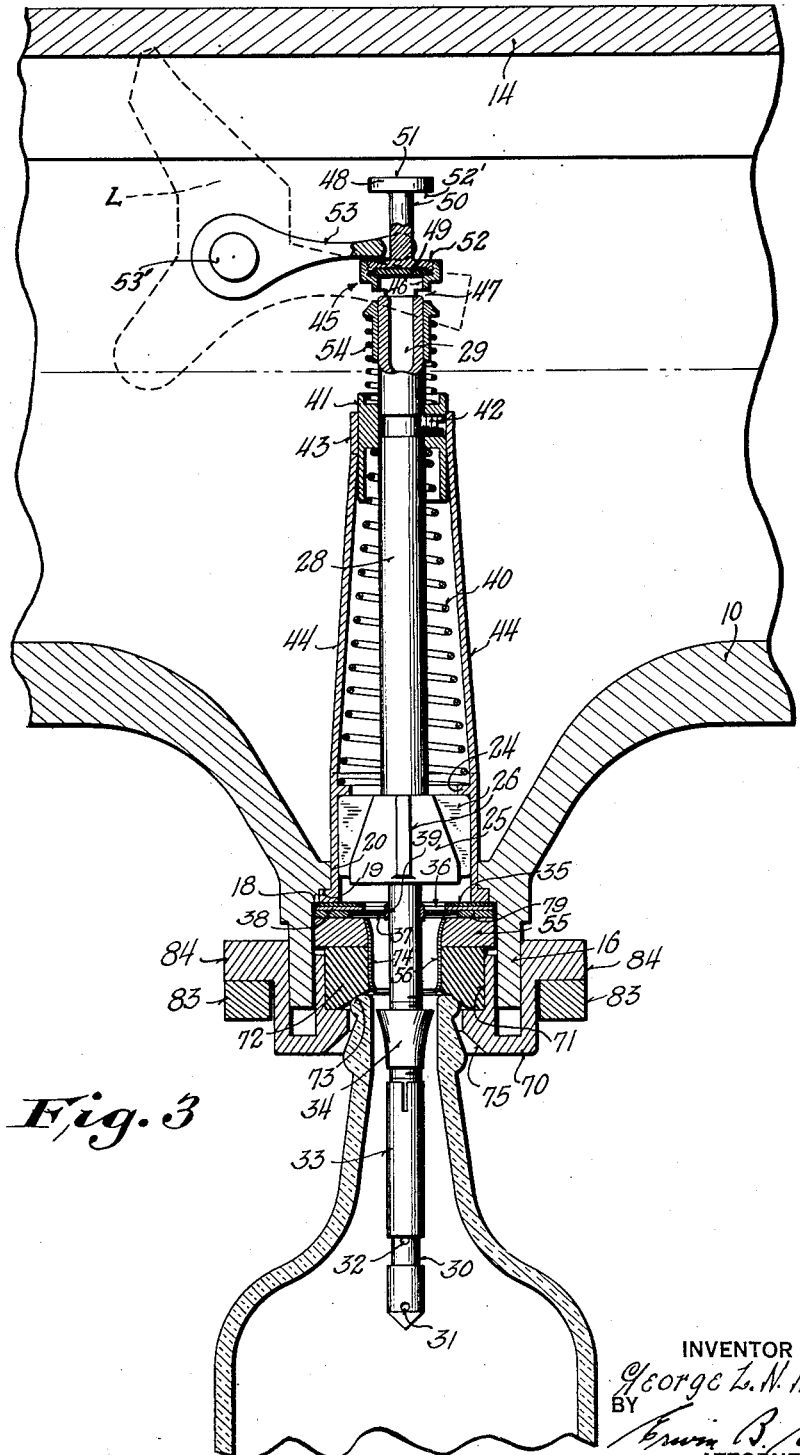

Patented Dec. 8, 1936

2,063,326

UNITED STATES PATENT OFFICE 2,063,326

FILLER VALVE

George L. N. Meyer, Milwaukee, Wis.

Application June 5, 1933, Serial No. 674,405

32 Claims. (Cl. 226—111).

This invention relates to bottle filling mechanisms for counter-pressure filling machines, and more particularly to filler valve mechanisms for controlling the flow of liquid into the bottles or containers to be filled.

In the operation of counter-pressure filling machines, the bottles or containers are filled with gas under pressure prior to the admission of the liquid. The gas pressure admitted is substantially equal to the pressure of the liquid to be admitted. This method of filling is advantageous in that foaming of the liquid is reduced to a minimum and, in bottling carbonated liquids, the loss of carbon dioxide gas is materially reduced.

Filler valves heretofore used on this type of machine have invariably been complicated in structure and all have possessed inherent defects. One of these defects has been the small tortuous liquid and gas passages. Another defect has been the multiplicity of parts which increases the cost of manufacture, renders cleaning difficult, and requires expert service to repair or replace parts of the valve assemblage.

One object of the present invention is to eliminate small and tortuous fluid conduits in filler valves.

Another object is to produce a filler valve of a comparatively few, rugged parts which may readily be taken apart for cleaning or repairing, and easily reassembled and adjusted.

Another object is to decrease the turbulence which ordinarily accompanies the introduction of the liquid into the container.

A further object is to prevent gas, which is trapped in the liquid passage, from bubbling up through the liquid in the bowl.

Another object is to produce a valve which has the liquid passage outside the gas passage and which will automatically shut off the flow of liquid at a predetermined liquid level in the container.

A further object is to produce a valve for use in counter-pressure bottling machines which has the liquid passage outside the gas passage and which will gradually reduce the pressure in the filled bottle to atmospheric.

Another object is to produce a valve which will automatically stop the flow of gas and liquid into the container upon failure of fluid pressure within the container.

With these and other objects in view, the nature of which will be apparent from the following description, the invention, consisting of certain constructions, and of certain parts, improvements and combinations, will be fully described in the following specification, and pointed out specifically in the appended claims.

In the drawings:—

Fig. 3 is a vertical sectional view similar to Fig. 2 showing both liquid and gas control valves in open position.

Figure 1:
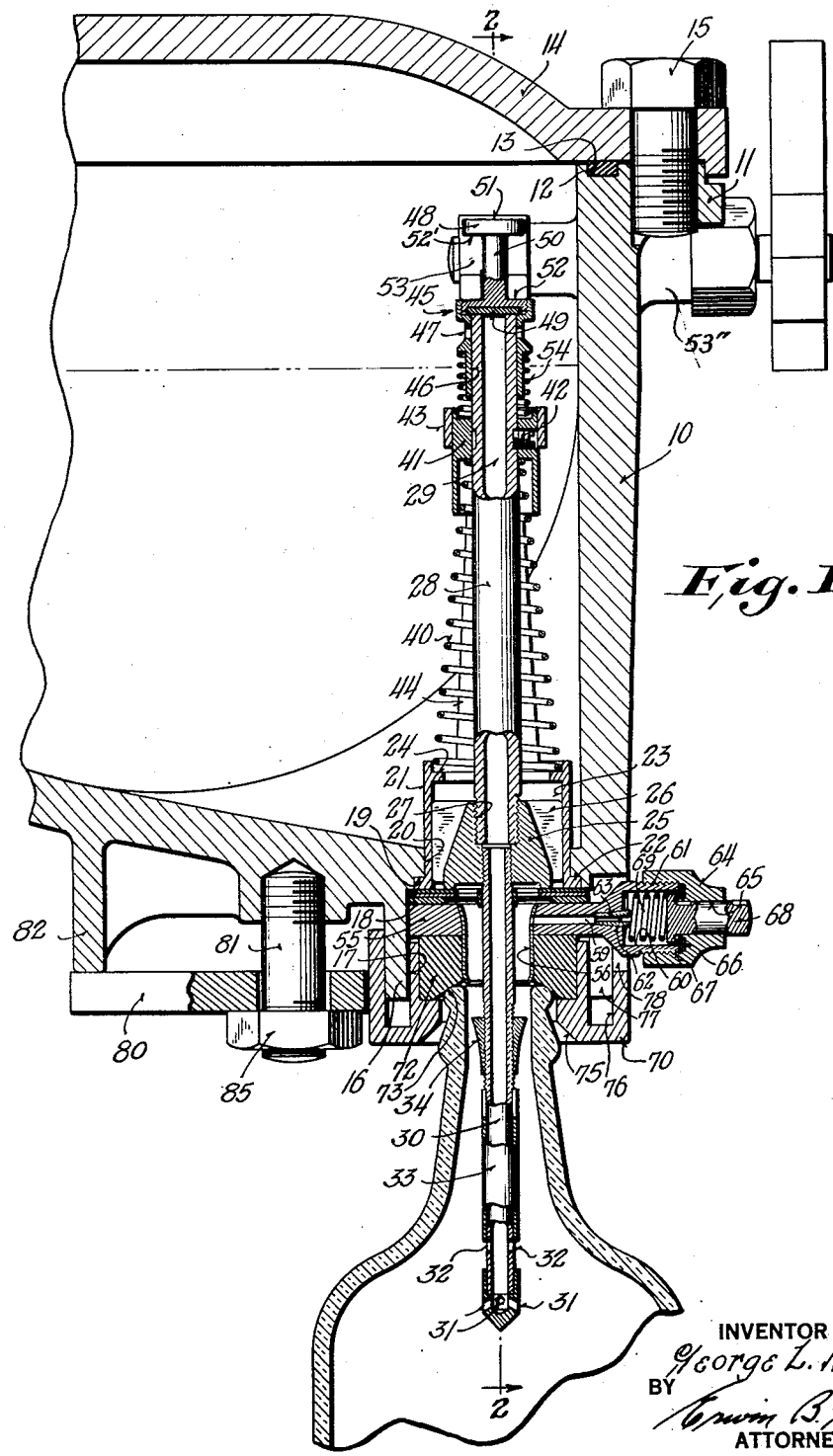
Fig. 1 is a vertical sectional view taken through a portion of the filler bowl of a counter-pressure filling machine showing a filler valve mechanism constructed according to the present invention, and positioned within a discharge opening of the bowl with the liquid, gas, and snifter valves all in closed position.

In the embodiment of the present invention chosen for illustrative purposes, a fragmentary portion of a counter-pressure filling machine is shown. This filling machine is of a well known type wherein a rotatable bowl or tank is adapted to contain both a liquid and a gas. The liquid level is maintained within predetermined limits by float controlled valves and the gas pressure in the bowl is automatically controlled by valves.

A bowl 10 is provided with a flange 11 containing an annular groove 12 which receives a sealing ring or rubber gasket 13. A cover 14 is adapted to close the upper portion of the bowl 10 and is retained in sealing position thereon by the application of cap screws 15, or other suitable anchoring means. The bottom of the bowl is provided with a plurality of spaced bosses 16 (one of which is shown) each containing a discharge opening 17. The discharge opening is reduced to form a shoulder 18 and further reduced to form a shoulder 19 which terminates in a bore 20 opening into the hollow bowl 10.

The filler valve assembly of the present invention is retained in position within the discharge opening 17 by suitable means which will be described in detail below.

The filler valve mechanism comprises a cage 21 of such diameter as to fit within the bore 20. The cage is provided with an outwardly directed flange 22 which cooperates with the shoulder 19 to limit the upward movement of the cage within the bore 20. A liquid passage 23 formed in the cage 21 is provided with an inwardly directed flange 24 which limits the upward movement of a liquid controlling valve 25. The valve 25 is guided for vertical sliding movement within the passage 23 by a plurality of spaced vertical wings 26 thereon. The valve 25 is provided with a vertical central bore 27 which is threaded to receive an upwardly extending tubular stem 28.

A gas conducting tube 30 which is closed at its lower extremity is threaded into the lower end of the bore 27 and the central passage in the tube forms a continuation of the bore 29 in the stem 28. A plurality of spaced radially extended ports 31 are formed in the tube 30 adjacent its lower extremity. A second series of similar ports 32 are formed in the tube above the ports 31. The ports 32 are opened or closed by the manual adjustment of a sleeve 33 which is slidably mounted on the tube 30. A spreader 34 is also adjustably mounted on the tube 30 and by its vertical adjustment it is possible to regulate the flow of liquid into the bottle in a manner to be more specifically described below. A ring shaped valve seat 35 and a foraminous element 36 encircle the tube 30 and are disposed between the liquid controlling valve 25 and the spreader element 34. The valve seat 35 cooperates with the valve 25 to control the flow of liquid through the bore 23.

The foraminous element 36 comprises a screen 37 suitably secured to a ring or washer 38. The openings in the screen are sized to permit the ready passage of liquid downward and to prevent the passage of gas up through the liquid after the ports 31 and 32 are above the liquid level. A ring or sleeve 39 is secured to the screen 37 and received over the upper end of the tube 30. The clearance between the sleeve 39 and the tube 30 is sufficiently small to insure the passage of the liquid through the screen rather than between the sleeve and tube.

A coil spring 40 surrounds the stem 28 and is seated at its lower extremity on the flange 24 in the cage 21. The upper end of the spring 40 seats against the lower end of a stop 41 which is releasably retained in adjustment on the stem 28 by a set screw 42. The spring 40 tends to retain the liquid controlling valve 25 in open position. The stop 41 is cylindrical in form and is slidably received in a guide sleeve 43 which may be formed integrally with the cage 21 and spaced therefrom by a pair of supporting legs 44.

A gas controlling valve 45 is provided with a bore 46 adapted to be slidably received on the upper end of the stem 28. The valve 45 has a plurality of ports 47 which admit gas into the passage 29 when the valve 45 is in open position. A valve cap 48 is threaded into the upper end of the valve 45 to retain a valve seat 49 of rubber or other suitable material so as to insure against leakage when the valve is in its extreme downward or closed position. The valve cap 48 has a stem 50 of reduced cross section thus forming a head 51 and lower and upper shoulders 52 and 52' respectively. A valve operating lever 53, positioned between shoulders 52 and 52', is movable to open the gas controlling valve 45 and to mechanically close both the gas controlling valve 45 and the liquid controlling valve 25. A coil spring 54 surrounds the stem 28 and is interposed between the valve 45 and the stop 41. The spring 54 tends to urge the gas controlling valve 45 up into open position. The lever 53 is mounted on a shaft 53', which is rotatably received in a bearing 53'' and actuated by a lever L on the outside of the tank 10. The bearing 53'' is fluid tight and provides sufficient friction to maintain the valves normally closed against the pressure of the springs 40 and 54.

A snifter valve body 55 preferably of annular form having a vertical central opening adapted to receive and retain a tube 56. The tube 56 has a slightly flared top portion 57 and a slightly reduced bottom opening 58. The upper end 57 of the tube is in alignment with the opening in the ring shaped valve seat 35 and the screen 37 to form a continuation of the liquid passage from the bowl. The lower end or mouth 58 of the tube lies at the mouth of the bottle, when the bottle is in raised position, so that liquid admitted to the tube 56 will be discharged into the bottle. The spreader element 34 cooperates with the opening 58 to distribute the liquid to the side wall of the container and is adjustable on the tube 30 to vary the size of the liquid discharge passage and so regulate the flow of liquid into the bottle. The spreader element, in addition to regulating the flow of liquid, disperses the column of liquid and distributes it uniformly over the entire inner wall of the neck of the bottle. By reason of capillary attraction, the liquid is held in contact with the inner wall of the bottle throughout its descent therein, and as a result the liquid flows in even distribution and at relatively low velocity and causes a minimum amount of agitation during the filling operation.

The snifter valve body 55 is provided with a horizontally disposed vent passage 59 which passes through the tube 56 and extends outwardly terminating in a cavity 60 of a boss 61. A plug 62 having a bleed passage 63 is adapted to be threaded into the outer end of the vent passage 59. A snifter valve cap 64 having an axial bore 65 is threaded onto the boss 61. A valve seat washer 66 of suitable material is retained within the cap and surrounds the inner end of the bore 65. A snifter valve 67 is provided with a stem 68 adapted to be guided in the bore 65. The valve 67 is maintained closed by a spring 69 in the housing 60 and is opened to vent gas from the top of the container by a cam (not shown). This cam, or other suitable means, opens the valve against the spring, and gas escapes through the port 65 past one or more flat sides on the stem 68 to the atmosphere.

A cap 70 retains the several elements in position in the filler valve assembly. This cap has a cavity 71 containing a soft rubber sealing ring 72 with a bevelled portion 73 at the lower end of its central opening 74. The opening 74 is adapted to receive the lower end of the tube 56. A flared opening 75 extends downward from the cavity 71 and receives and centers the mouth of the bottle. An annular channel 76 is formed in the cap 70. The channel 76 serves as a recess within which the boss 16 of the bowl 10 is adapted to lie. The boss 16 and cap 70 are each provided with vertically extended cooperating slots 77 and 78 respectively to receive and position the snifter valve boss 61.

The assembling and positioning of the valve mechanism is extremely simple. The liquid and gas control valve assembly is inserted as a unit into the discharge passage 17 in the boss 16 and held so that the flange 22 of the cage 21 and valve seat 35 with the foraminous element 36 are in contact with shoulders 19 and 18 respectively. A resilient gasket 79 may then be placed upon the top of the snifter valve body 55 and both raised into the passage 17 with the boss 61 extending outwardly through the slot 77. The cap 70 with the rubber sealing ring 72 in position may then be placed over the boss 16 with the slot 78 therein passing over the boss 61 of the snifter valve. A strap 80 having a forked end 83 may then be secured by a stud 81 to the bowl 10 with one end in contact with a stop 82 on the bowl and the forked end 83 spanning the cap 70 and in contact with a pair of ears 84 formed thereon. A nut 85 may then be threaded on the stud 81 and tightened to exert a sufficient pressure on the cap 70 to compress the soft rubber sealing gasket 72 within the cavity 71 and to compress the gasket 79 to insure against liquid leakage past the liquid controlling valve 25.

Figure 2:
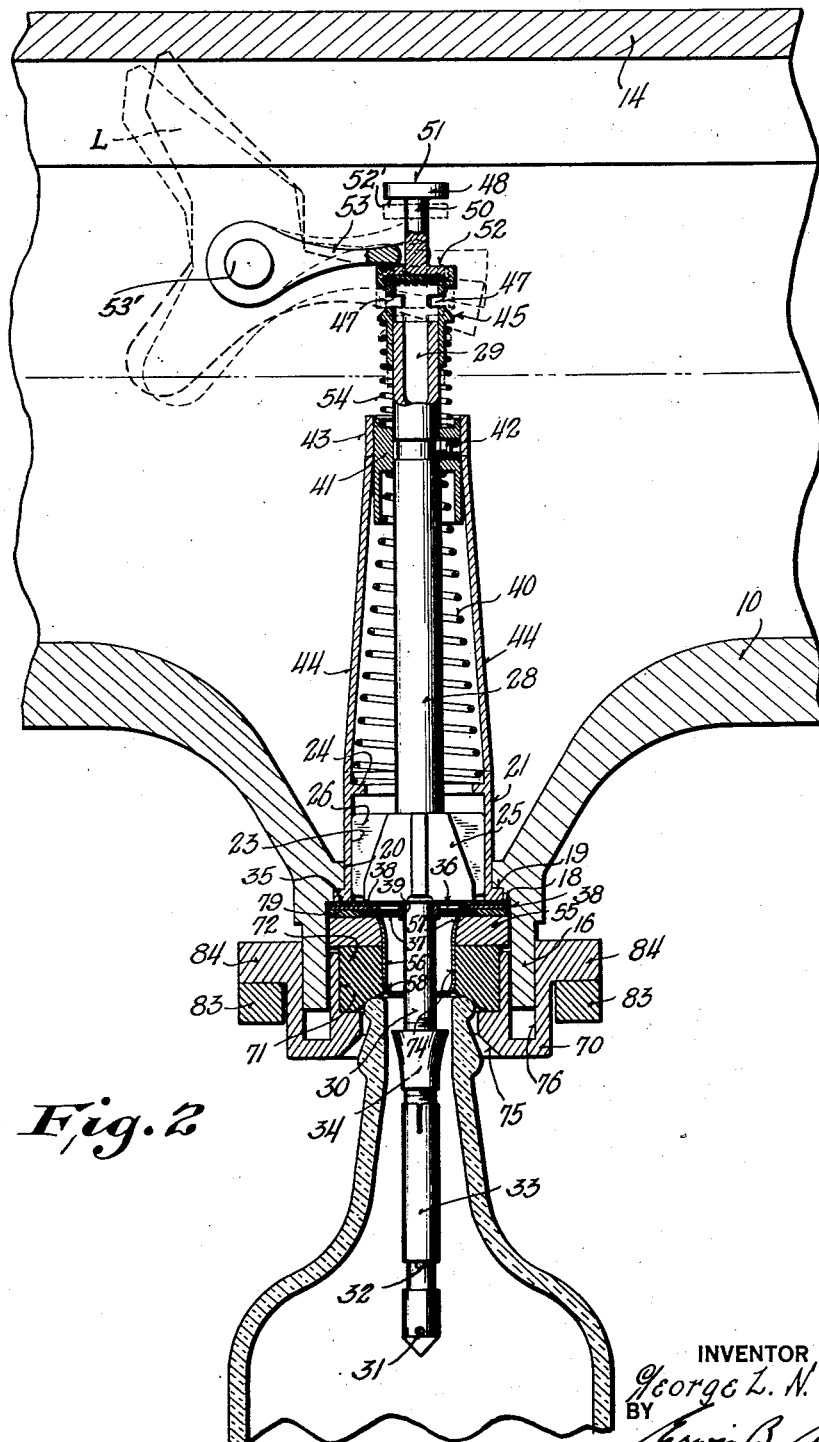
Fig. 2 is a vertical sectional view on the line 2—2 of Fig. 1 showing the gas control valve in normal open position with the extreme open position thereof shown in dotted lines.

In operation the bowl 10 is charged in the usual manner with liquid and gas under pressure while the filler valves are in closed position (as shown in Fig. 1). As a bottle is raised, in the usual manner, into sealing engagement with the cushion gasket 72 it forms an air-tight seal therewith. Subsequent to this the valve operating lever 53 is raised by simple cam action or other well known mechanical means. As the bifurcated portion of the lever 53 raises, it contacts the shoulder 52' and urges the valve 45 upward against the gas pressure in the bowl to the position shown in dotted lines in Fig. 2. In this position the valve 45 is open, and gas flows through the tubes 28 and 30, and out through the ports 31 and 32 into the bottle to be filled. When the pressure in the bottle is approximately equal to the pressure in the bowl the valve 25 is raised from its seat 35 by the coil spring 40 and allows liquid to flow from the bowl 10 through the bore 23 past the valve 25 and through the screen 37 into the tube 56 from which it is discharged onto the spreader element 34 and into the container. During the filling operation the gas displaced in the bottle by the incoming liquid is vented through the ports 31 and 32, the tube 30, the passage 29 and through the open gas control valve 45.

When the bottle has filled to a height where liquid covers ports 32 air venting ceases through the ports and gas pressure builds up in the tube 56 and shuts off further flow of liquid. This condition is brought about by the surface tension between the liquid and the fine mesh of the screen 37 in the liquid passage which is of sufficient strength to preclude the escape of gas upwardly from the neck of the bottle through the liquid passage and to preclude the passage of the liquid downwardly against the increased gas pressure. At this time the valve operating lever 53 is directed downwardly and the bifurcated end thereof engages the face 52 on the cap 48 to close the gas controlling valve 45 and seat the liquid controlling valve 25 (as shown in Fig. 1). Subsequent to the closing of the liquid and gas controlling valves, a cam or other suitable operating means engages the stem 68 of the snifter valve 67 and unseats it to permit the entrapped gas pressure in the neck of the bottle to be slowly discharged through passage 59, bleed passage 63, chamber 60, past the open valve 67 and out to atmosphere. At this time the bottle is withdrawn from the filling tube in the usual manner and removed or conveyed from the machine.

A safety feature is also incorporated in the present valve construction. After the gas control valve 45 has been raised mechanically by the cam operated lever 53 to the dotted line position of Fig. 2 to admit counter-pressure gas to the bottle, the lever 53 is moved downwardly by mechanical means to a position shown in full lines in Fig. 2, wherein the ports 47 of the gas control valve 45 are still in a position to admit gas to the passage 29. If no bottle has been provided beneath the filler valve mechanism or if an imperfect seal has been made the pressure of the gas in the bowl will be sufficient to act upon the head 51 of the valve cap 48 and return the valve 45 to its closed or seated position against the action of the coil spring 54. The neutral position of the valve operating lever 53 is maintained throughout the filling operation and hence should the seal between the bottle and gasket 72 be broken or should the bottle burst during the filling operation the pressure in the bowl is sufficient to effect an automatic closing operation of both the gas and liquid control valves and thus prevent either the escape of liquid or gas from the bowl.

It will readily be understood from the foregoing description that a simple, sturdy and efficient filler valve mechanism has been provided. Furthermore, the entire valve mechanism is readily removable as a unit from the bowl for inspection, cleansing or repair by the removal of a single nut 85 after which the entire valve assembly may readily be withdrawn by merely turning the valve operating cam to a position in which the lever 53 is free from engagement with the valve cap 48. The device is of extremely simple design so that any replacement or repair may be readily effected by anyone with reasonable assurance that the valve will function efficiently upon reapplication to the machine. This condition is possible by reason of the fact that no fine adjustments are required in the present valve in order to insure its proper and efficient operation.

While the invention has been described in considerable detail in the foregoing specification, it is understood that various changes may be made in its embodiment without departing from or sacrificing any of the advantages hereinafter claimed.

I claim:

1. A valve mechanism for counter-pressure fillers comprising, a movable stem, a liquid controlling valve mounted on said stem to move therewith, a movable gas controlling valve on said stem, and means to effect movement of said gas controlling valve independently of movement of said stem.

2. A valve mechanism for counter-pressure fillers comprising, a movable gas tube, a liquid controlling valve fixed on said tube intermediate the ends thereof, a gas controlling valve movable on said tube adjacent the upper end thereof, means to effect movement of said gas controlling valve independently of movement of said tube, and a spreader element on said tube below said liquid controlling valve.

3. A valve mechanism for counter-pressure fillers comprising, a liquid controlling valve, a gas tube depending from said valve, and a foraminous element surrounding said tube below said liquid controlling valve.

4. A valve mechanism of the character described comprising, a liquid conduit, a liquid control valve movable to control the flow of liquid through said conduit, a gas tube mounted in and depending from said valve and having a plurality of ports in the lower end thereof, and adjustable means to cover said ports.

5. A valve mechanism for counter-pressure fillers comprising, a hollow stem, a liquid controlling valve fixed on said stem intermediate the ends thereof, a gas controlling valve movable on said stem above said liquid controlling valve, a spreader element on said stem below said liquid controlling valve, and a foraminous element on said stem.

6. A valve mechanism for counter-pressure fillers comprising, a stem, a liquid controlling valve fixed on said stem, a movable gas controlling valve on said stem above said liquid controlling valve, means to close both the said valves, means to open said gas controlling valve, and means to open said liquid controlling valve.

7. A filler valve mechanism for counter-pressure fillers comprising, a stem, a liquid controlling valve on said stem, a movable gas controlling valve on said stem in axial alignment with said liquid controlling valve, means to close both of said valves, means to open said gas controlling valve, and means to open said liquid controlling valve.

8. A valve mechanism for counter-pressure fillers comprising, a stem, a liquid controlling valve fixed to said stem, a gas controlling valve movable on said stem, a gas tube depending from said liquid controlling valve, means to close both of said valves, means to open said gas controlling valve, means to open said liquid controlling valve, and a spreader element on said gas tube.

9. A valve mechanism for counter-pressure fillers comprising, a liquid controlling valve, a gas tube extending through said liquid controlling valve, a gas controlling valve on said tube, means to close both of said valves, means to open said gas controlling valve, means to open said liquid controlling valve, and a foraminous element surrounding said tube adjacent said liquid controlling valve.

10. A valve mechanism for counter-pressure fillers comprising, a liquid controlling valve, a gas tube extending through said liquid controlling valve and having vent holes therein below said liquid controlling valve, a gas controlling valve on said tube above said liquid controlling valve, means to close both of said valves, means to open said gas controlling valve, means to open said liquid controlling valve, and a spreader element adjustably mounted on said tube above said vents.

11. A valve mechanism for counter-pressure fillers comprising, a liquid controlling valve, a gas tube extending through said liquid controlling valve and having vent holes therein below said liquid controlling valve, a gas controlling valve on said tube above said liquid controlling valve, means to close both of said valves, means to open said gas controlling valve, means to open said liquid controlling valve, a spreader element adjustably mounted on said tube above said vents, and a foraminous element surrounding said gas conducting tube above said spreader element.

12. A filler valve mechanism for counter-pressure fillers comprising, a stem, a liquid controlling valve on said stem, resilient means for urging said liquid controlling valve to open position, a gas controlling valve on said stem, resilient means for urging said gas controlling valve to open position, and means to close both of said valves against the action of both said resilient means.

13. A valve mechanism for counter-pressure fillers comprising, a liquid controlling valve, a gas tube extending through said liquid controlling valve and having an outlet below said valve, resilient means for urging said liquid controlling valve to open position, a gas controlling valve on said tube above said liquid controlling valve, resilient means for urging said gas controlling valve to open position, and means to close both of said valves against the action of both said resilient means.

14. A valve mechanism for counter-pressure fillers comprising, a stem, a liquid controlling valve fixed to said stem, resilient means for urging said liquid controlling valve to open position, a gas controlling valve on said stem above said liquid controlling valve, resilient means for urging said gas controlling valve to open position, means to close both of said valves, a gas tube depending from said liquid controlling valve, a spreader element on said tube, and a foraminous element surrounding said tube above said spreader element.

15. A filler valve mechanism for counter-pressure fillers comprising, a stem, a liquid controlling valve on said stem, a gas controlling valve on said stem above and in axial alignment with said liquid controlling valve, a snift valve below said liquid controlling valve, means to effect the closing of each of said valves, and means to effect the independent opening of said liquid and gas controlling valves.

16. The combination with a filler bowl containing a liquid under pressure and having a discharge opening, of a valve assembly, said valve assembly comprising, a valve cage, a liquid controlling valve within said cage, a hollow stem extending through said liquid controlling valve, a gas controlling valve on said stem above said liquid controlling valve, a liquid conduit below said liquid controlling valve and surrounding said gas conduit, a snift valve communicating with said liquid conduit, means to close each of said valves and means to effect the independent opening of the liquid and gas controlling valves.

17. The combination with a filler bowl adapted to contain a liquid under pressure and having a discharge opening, of a valve assembly adapted for retention within said discharge opening, said valve assembly comprising, a valve cage having a liquid conduit therethrough, a liquid valve to control the flow of liquid through said conduit, a gas tube extending through said liquid controlling valve, a gas controlling valve on said tube above said liquid controlling valve, an element below said valve cage having a liquid passage therethrough, and a snift valve communicating with the liquid passage in said element.

18. A valve mechanism for counter-pressure fillers comprising, a hollow stem, a liquid controlling valve fixed on said stem, a valve on said stem above said liquid controlling valve to control the flow of gas through said stem, a snift valve below said liquid controlling valve, means to close each of said valves, and means to effect independent opening of the liquid and gas controlling valves.

19. A valve mechanism for application to a discharge opening of a filler bowl containing a liquid and gas under pressure, said valve mechanism comprising, a valve casing adapted to be releasably retained within the discharge opening of the filler bowl, said casing having a liquid conduit therein, a movable liquid valve to control the flow of liquid through said conduit, a hollow stem extending through said liquid valve, a valve on said stem to control the flow of gas through the stem, and a snift valve in communication with said liquid conduit.

20. In a counter-pressure filler for containers, the combination of, a gas tube projecting into said container and adapted to deliver gas through an opening therein to the container, a liquid conduit above said opening to deliver liquid to said container to a height above said opening whereby gas is trapped in said liquid conduit, and a foraminous element in said liquid conduit having holes therein of sufficient size to prevent the trapped gas from passing through the foraminous element against the liquid pressure.

21. The combination recited in claim 20 in which the liquid conduit encircles the gas conduit.

22. The combination recited in claim 20 including a valve in said liquid conduit.

23. The combination recited in claim 20 including a valve in said liquid conduit, and a valve controlling the flow of gas through said tube.

24. In a counter-pressure filler for containers, the combination of, a gas tube projecting into said container and adapted to deliver gas through an opening therein to the container, a liquid conduit above said opening to deliver liquid to the container to a height above said opening whereby gas is trapped in said liquid conduit, and means in said liquid conduit operable when gas pressure is built up in the conduit to stop the flow of liquid therethrough.

25. The combination recited in claim 24 in which the liquid conduit encircles the gas conduit.

26. The combination recited in claim 24 including a valve in said liquid conduit and a valve controlling the flow of gas through said tube.

27. In a counter-pressure filling mechanism, the combination of, a gas control valve, a liquid control valve, a mechanism to open said gas control valve independently of said liquid control valve and to close both of said valves, and means independent of said mechanism when the gas control valve is open to open said liquid control valve.

28. A counter-pressure filling machine to fill bottles or the like, comprising, a filler bowl adapted to contain a liquid and a gas under pressure, a filler valve mechanism comprising, a gas conducting tube extending into said gas and adapted to deliver gas to said bottle, a gas control valve controlling the flow of gas through said tube, a liquid conducting tube adapted to deliver liquid to said bottle, a valve to control the flow of liquid through said liquid conducting tube, means to open said gas control valve against the pressure of said gas, and means to maintain said gas control valve open during normal filling operation, said last named means being rendered ineffective upon failure of pressure in the bottle to allow the gas control valve to close.

29. A counter-pressure filling machine to fill bottles or the like, comprising, a filler bowl adapted to contain a liquid and a gas under pressure, a filler valve mechanism comprising, a gas conducting tube extending into said gas and adapted to deliver gas to said bottle, a gas control valve controlling the flow of gas through said tube, a liquid conducting tube adapted to deliver liquid to said bottle, a valve to control the flow of liquid through said liquid conducting tube, means to open said gas control valve against the pressure of the gas, means to maintain said gas control valve open during normal filling of said bottle, and means to open said liquid control valve and to maintain the same open during normal filling operation, said last two means being rendered ineffective to permit said valves to close in the event of failure of pressure in the bottle.

30. A valve mechanism for counter-pressure fillers comprising, a gas tube having an outlet at the lower end thereof and depending into a container to be filled, a liquid tube opening into the container above the level of said outlet whereby gas is trapped in the container and in the liquid tube above said outlet when the liquid level in the container rises above the outlet, a liquid valve and a gas valve to control the flow of fluids through said liquid and gas tubes respectively, and a snift valve communicating with the liquid tube below the liquid valve to vent the trapped gas.

31. A valve mechanism as defined in claim 30 including a foraminous element interposed across the liquid passage to prevent air trapped therein from passing upwardly through the liquid in the counter-pressure filler.

32. A valve mechanism as defined in claim 30 including means in said liquid tube to prevent the trapped gas passing through the liquid in the counter-pressure filler.

GEORGE L. N. MEYER.